(No Model.)

L. SANDERS.
BELT CLASP.

No. 391,197. Patented Oct. 16, 1888.

WITNESSES:
Phil. C. Dietrich.
E. M. Clark.

INVENTOR:
Louis Sanders.
BY Munn & Co.
ATTORNEYS.

UNITED STATES PATENT OFFICE.

LOUIS SANDERS, OF BROOKLYN, NEW YORK.

BELT-CLASP.

SPECIFICATION forming part of Letters Patent No. 391,197, dated October 16, 1888.

Application filed July 28, 1888. Serial No. 281,274. (No model.)

*To all whom it may concern:*

Be it known that I, LOUIS SANDERS, of Brooklyn, in the county of Kings and State of New York, have invented a new and Improved Belt and Clasp therefor, of which the following is a full, clear, and exact description.

The invention herein shown and described is intended to be worn by men and women, and its object is to effect a saving in the belt material over the means at present used and to provide a clasp capable of clamping a belt of any ordinary thickness; and it consists in the novel construction and combinations of parts, as hereinafter described, and pointed out in the claim.

Reference is to be had to the accompanying drawings, forming a part of this specification, in which similar letters of reference indicate corresponding parts in all the figures.

Figure 1:
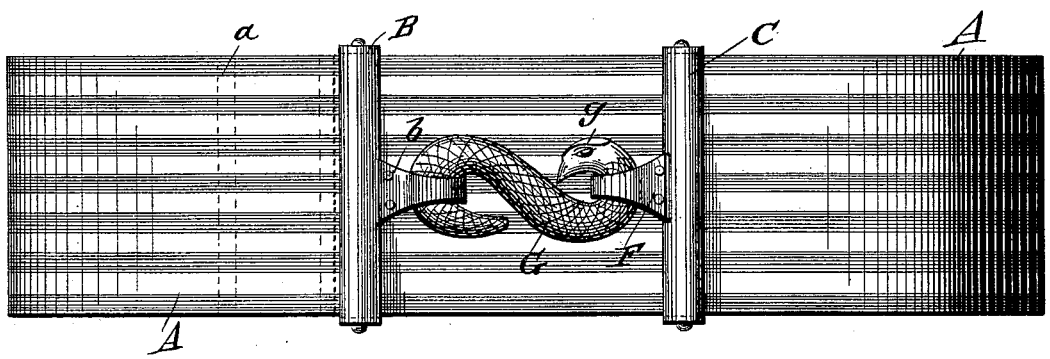
Figure 2:
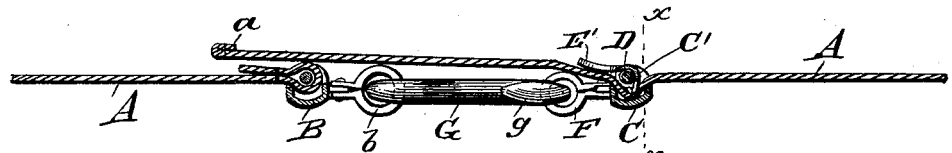
Figure 3:
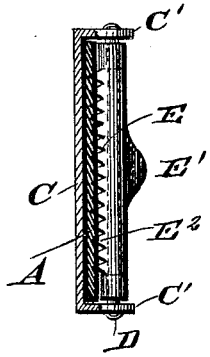
Figure 4:
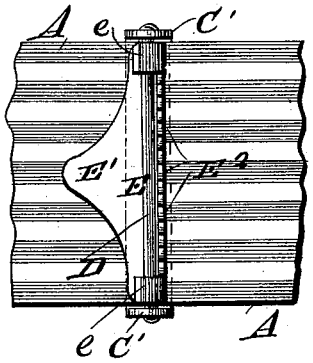
Figure 5:
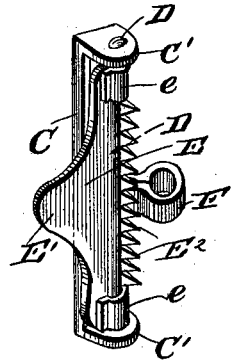

Figure 1 represents a front view of my invention. Fig. 2 is a longitudinal sectional view. Fig. 3 is a section on the line $xx$ of Fig. 2. Fig. 4 is a rear view of a part of the belt and the toothed clamp on the clasp, the teeth being turned away from the cloth; and Fig. 5 is a perspective view of the sliding part of the clasp, the hook being removed.

One end of the belt A is turned over and stitched, so as to form an enlarged part, $a$. The other end of the belt has secured thereto a bar, B, having a loop, $b$. The sliding part of the clasp consists in a bar, C, having end or ear pieces, C' C', which are bent, respectively, at right angles to the said bar. Each end piece, C', is provided with an opening, in which is journaled a rod, D.

E is a toothed plate secured by end lips, $e\ e$, to the rod D. The plate E has a tongue or thumb-piece, E', formed integral therewith, and E² represents the teeth on said plate E. The teeth and tongue aforesaid extend outward at right angles to each other. The bar C is also provided with a loop, F, fixed thereto.

G indicates an S-shaped hook, one end of which, $g$, is connected with and closed on the loop F, the opposite end engaging the loop $b$ on the bar B.

The operation is as follows: One end of the belt is passed between the bar C and toothed bar E. The enlarged end of the belt $a$ prevents the movable part of the clasp from sliding off. The adjustment of the clasp is effected by moving the bar C and connected parts along the belt. This may be done when the bar is turned into the position shown in Fig. 4. When the teeth are turned inward, as shown in Fig. 2, they engage the belt and secure the hook in a fixed position with relation to said belt.

In the form of belt wherein a lap is taken in the material and the adjustment effected and parts secured by means of a slide a leather belt cannot be satisfactorily used, owing to its thickness—that is to say, the usual form of slide is not adapted to receive, secure, and permit of adjustment of a belt formed of thick material. By the use of my device no lap is necessary, and a belt of any thickness may be easily adjusted and firmly retained in any desired position.

Having thus described my invention, what I claim as new, and desire to secure by Letters Patent, is—

An improved belt clasp consisting of the bar B, provided with the loop $b$, the bar C, provided with the loop F, the toothed plate E, pivoted to the bar C, and the hook G, engaging the loops of the said bars, substantially as herein shown and described.

LOUIS SANDERS.

Witnesses:
EDGAR TATE,
JNO. M. RITTER.